(12) United States Patent
Schober et al.

(10) Patent No.: US 11,893,843 B2
(45) Date of Patent: Feb. 6, 2024

(54) COMMUNICATION NODE AND CORRESPONDING OPERATING METHOD

(71) Applicant: NXP B.V., Eindhoven (NL)

(72) Inventors: Michael Schober, Graz (AT); Christian Eisendle, Graz (AT); Stefan Lemsitzer, Stainz (AT)

(73) Assignee: NXP B.V., Eindhoven (NL)

( * ) Notice: Subject to any disclaimer, the term of this patent is extended or adjusted under 35 U.S.C. 154(b) by 226 days.

(21) Appl. No.: 17/450,088

(22) Filed: Oct. 6, 2021

(65) Prior Publication Data

US 2022/0139133 A1    May 5, 2022

(30) Foreign Application Priority Data

Nov. 5, 2020 (EP) .................................... 20206040

(51) Int. Cl.
  *G07C 9/00* (2020.01)
  *H04W 64/00* (2009.01)
  *H04W 72/56* (2023.01)

(52) U.S. Cl.
  CPC ...... *G07C 9/00309* (2013.01); *H04W 64/003* (2013.01); *G07C 2009/00333* (2013.01); *H04W 72/56* (2023.01)

(58) Field of Classification Search
  CPC ..... G07C 9/00309; G07C 2009/00333; H04W 4/023; H04W 64/00
  See application file for complete search history.

(56) References Cited

U.S. PATENT DOCUMENTS

| | | | |
|---|---|---|---|
| 10,486,646 B2 | 11/2019 | Ledvina et al. | |
| 2015/0200706 A1 | 7/2015 | Bottazzi et al. | |
| 2019/0308612 A1* | 10/2019 | Lavoie | B62D 15/0285 |
| 2020/0015038 A1* | 1/2020 | Burugupalli | H04W 4/023 |

(Continued)

OTHER PUBLICATIONS

Jones, Eldon F.; "Scheduling 101—the basic of best practices"; Paper presented at PMI Global Congress, Oct. 13, 2009, Orlando, Florida; https://www.pmi.org/learning/library/schedule-101-basic-best-practices-6701.

(Continued)

*Primary Examiner* — Thomas S Mccormack (57) ABSTRACT

In accordance with a first aspect of the present disclosure, a communication node is provided, comprising: an ultra-wideband (UWB) communication unit configured to enable UWB communication with a plurality of external communication nodes; a processing unit configured to perform ranging sessions between the communication node and said external communication nodes, wherein said ranging sessions comprise one or more distance measurements based on messages exchanged through the UWB communication unit between the communication node and said external communication nodes; and a prioritization unit configured to prioritize said ranging sessions in dependence on at least one previously measured distance between the communication node and the respective external communication nodes. In accordance with a second aspect of the present disclosure, a method of operating a communication node is provided. In accordance with a third aspect of the present disclosure, a computer program is provided, comprising executable instructions for carrying out said method.

16 Claims, 5 Drawing Sheets

Scenario 1:

Scenario 2:

(56) References Cited

U.S. PATENT DOCUMENTS

2020/0098241 A1\* 3/2020 Skaaksrud .............. H04L 67/12
2020/0198580 A1 6/2020 Saleh et al.

OTHER PUBLICATIONS

Liu, Kuang-Hao et al.; "Exclusive-Region Based Scheduling Algorithms for UWB WPAN"; Published in IEEE Transactions on Wireless Communications, vol. 7, Issue 3, Mar. 14, 2008; DOI: 10.1109/TWC.2008.060707.

\* cited by examiner

Scenario 1:

Scenario 2:

COMMUNICATION NODE AND CORRESPONDING OPERATING METHOD

CROSS-REFERENCE TO RELATED APPLICATIONS

This application claims priority under 35 U.S.C. § 119 to European Patent Application No. 20206040.6, filed on Nov. 5, 2020, the contents of which are incorporated by reference herein.

TECHNICAL FIELD

The present disclosure relates to a communication node. Furthermore, the present disclosure relates to a corresponding method of operating a communication node.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

SUMMARY

In accordance with a first aspect of the present disclosure, a communication node is provided, comprising: an ultra-wideband (UWB) communication unit configured to enable UWB communication with a plurality of external communication nodes; a processing unit configured to perform ranging sessions between the communication node and said external communication nodes, wherein said ranging sessions comprise one or more distance measurements based on messages exchanged between the communication node and said external communication nodes, wherein said messages are exchanged through the UWB communication unit; and a prioritization unit configured to prioritize said ranging sessions in dependence on at least one previously measured distance between the communication node and the respective external communication nodes.

In one or more embodiments, the prioritization unit is configured to increase the priority of a specific one of said ranging sessions, to be performed with a specific external communication node, if one or more previously performed distance measurements with said specific external communication node indicate that the distance between the communication node and said specific external communication node has decreased.

In one or more embodiments, the prioritization unit is configured to decrease the priority of said specific one of the ranging sessions if the previously performed distance measurements indicate that the distance between the communication node and the external communication node has increased.

In one or more embodiments, the prioritization unit is configured to compare the previously measured distance against at least one predefined range of distances, and to change the priority of the ranging sessions if the previously measured distance falls within said predefined range.

In one or more embodiments, the predefined range of distances corresponds to a geographical area or zone.

In one or more embodiments, the prioritization unit is configured to prioritize a specific one of said ranging sessions by changing a value of a priority parameter used by a scheduler of the communication node.

In one or more embodiments, when a specific ranging session associated with said priority parameter collides or overlaps with at least one other ranging session in a given time slot, the scheduler is configured to schedule said specific ranging session if the priority parameter has a higher value than a priority parameter associated with the other ranging session.

In one or more embodiments, the prioritization unit is further configured to communicate a change of the value of the priority parameter to the external communication node with which the specific one of the ranging sessions is performed.

In one or more embodiments, the prioritization unit is configured to communicate said change through the UWB communication unit.

In one or more embodiments, the prioritization unit is configured to prioritize said ranging sessions in dependence on data indicative of an application or a use of the communication node.

In one or more embodiments, the prioritization unit is configured to prioritize said ranging sessions in dependence on data derived from the previously measured distance and/or in dependence on data indicative of the previously measured distance.

In one or more embodiments, the prioritization unit is further configured to prioritize said ranging sessions in dependence on at least one of the following parameters: the strength or quality of UWB communication channels established by the UWB communication unit, a detected movement of the communication node, and changes of characteristics of one or more additional communication channels.

In one or more embodiments, the communication node is a mobile device for accessing an external object, such as a vehicle, or a mobile device for opening an external object, such as a door.

In accordance with a second aspect of the present disclosure, a method of operating a communication node is conceived, comprising: enabling, by an ultra-wideband, UWB, communication unit comprised in said communication node, UWB to communication with a plurality of external communication nodes; performing, by a processing unit comprised in said communication node, ranging sessions between the communication node and said external communication nodes, wherein said ranging sessions comprise one or more distance measurements based on messages exchanged between the communication node and said external communication nodes, wherein said messages are exchanged through the UWB communication unit; and prioritizing, by a prioritization unit comprised in said communication node, said ranging sessions in dependence on at least one previously measured distance between the communication node and the respective external communication nodes.

In accordance with a third aspect of the present disclosure, a computer program is provided, comprising executable instructions which, when executed by a communication node, cause said communication node to carry out a method of the kind set forth.

DESCRIPTION OF DRAWINGS

Embodiments will be described in more detail with reference to the appended drawings, in which.

DESCRIPTION OF EMBODIMENTS

As mentioned above, ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

Accordingly, UWB technology may be used to measure the distance between a UWB communication node (for example, a mobile device that functions as a key for accessing a vehicle or opening a door) and various external UWB communication nodes (for example, a vehicle and a door). Typically, distance measurements are performed during UWB communication sessions referred to as a ranging sessions. A typical UWB-based ranging session includes one or more messages (i.e., frames that are part of a distance estimation sequence) transmitted from a UWB communication node (which may also be referred to as a "reader") to one or more external UWB communication nodes (i.e., communication nodes which are external to the communication node), as well as one or more messages in response to those frames, which are transmitted back to the communication node by the external communication nodes. It is noted that, depending on the role assigned to the communication node and the external communication nodes in this message exchange, either the communication node may act as an "initiator" or "controller" (in which case the external communication nodes act as "responders" or "controlees") or the communication node may act as a "responder" or "controlee" (in which case the external communication nodes act as "initiators" or "controllers").

Figure 1:
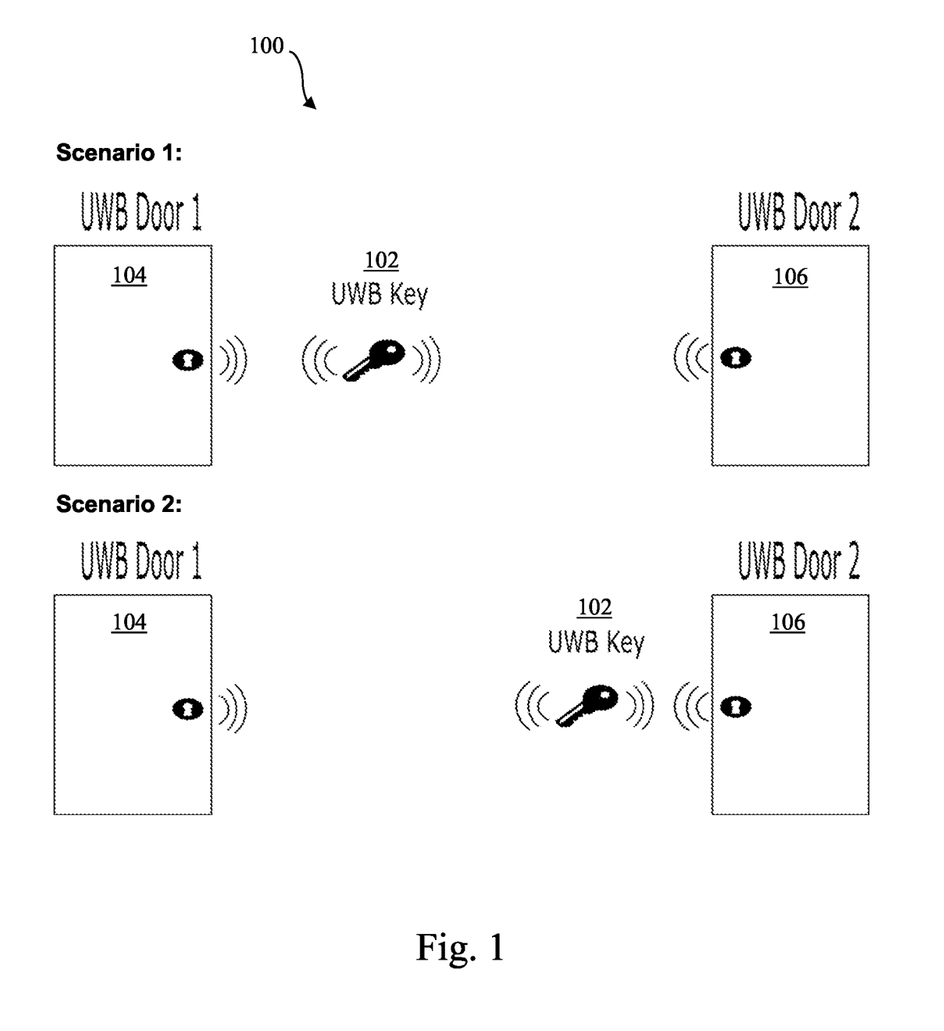
FIG. 1 shows an example of a UWB-based access system.

FIG. 1 shows an example of a UWB-based access system 100, in particular a system for opening doors 104, 106 by means of a key 102. Both the doors 104, 106 and the key 102 are equipped with UWB technology. Thus, all the devices have a UWB interface which can be used for a distance measurements. It is noted that the key 102 can be any type of device that is suitable for unlocking a door. For instance, the key 102 may be a mobile phone that is configured to transmit a user credential to a lock of the respective doors 104, 106. The key 102 has two actively running ranging sessions (i.e., applications): a session for ranging with the first UWB-enabled door 104 and a session for ranging with the second UWB-enabled door 106. Each ranging session contains one or more distance measurements, based for example on the cumulative time of flight of messages transmitted to the doors 104, 106 by the key 102 and responses transmitted to the key 104, 106 by the door.

Accordingly, multiple ranging sessions should be supported at the same time. Typically, the key 102 contains a scheduler which facilitates managing the plurality of ranging sessions. For example, in order to achieve a satisfactory user experience, a particular door should open within 200 ms after the key 102 has entered a radius of less than one meter to the door. However, if multiple ranging sessions are configured, it may occur that the configured sessions collide with each other and that the sessions trigger an action (e.g., a distance measurement operation) at the same time. In other words, the ranging sessions may overlap with each other. Accordingly, depending on the session priority, one of the two sessions will be scheduled more often than the other one. This session priority is determined by a priority parameter (i.e., a priority setting) used by the scheduler. The higher the value of this priority parameter, the more likely it is that the corresponding ranging session will be scheduled. So, for instance, if one ranging session performed by a node has a priority parameter value of 50 and a colliding ranging session performed by the same node has a priority parameter value of 100, then the latter will be scheduled by the scheduler of said node, for execution in the time slot in which the two sessions collide.

Since every door has a corresponding UWB session priority the priority setting can be used for scheduling a ranging session with one door more often than with the other door. For example, if the first door 104 has a higher priority than the second door 106, the first door 104 will be scheduled more often, which leads to a better user experience if a user approaches the first door 104 with the key 102. Unfortunately, this leads to a worse user experience if a user approaches the second door 106 with the key 102, because ranging sessions with the second door 106 are scheduled less often. Especially if a smart door opening system consists of multiple doors and the key 102 has to serve also other UWB-based applications, a static scheduling priority scheme may lead to inefficient scheduling from a user experience perspective. For example, a door might open only after a significant delay.

Now discussed are a communication node and a corresponding method of operating a communication node, which facilitate a more flexible scheduling of ranging sessions between the communication node and external communication nodes, thereby increasing the user experience in an access system of the kind set forth.

Figure 2:
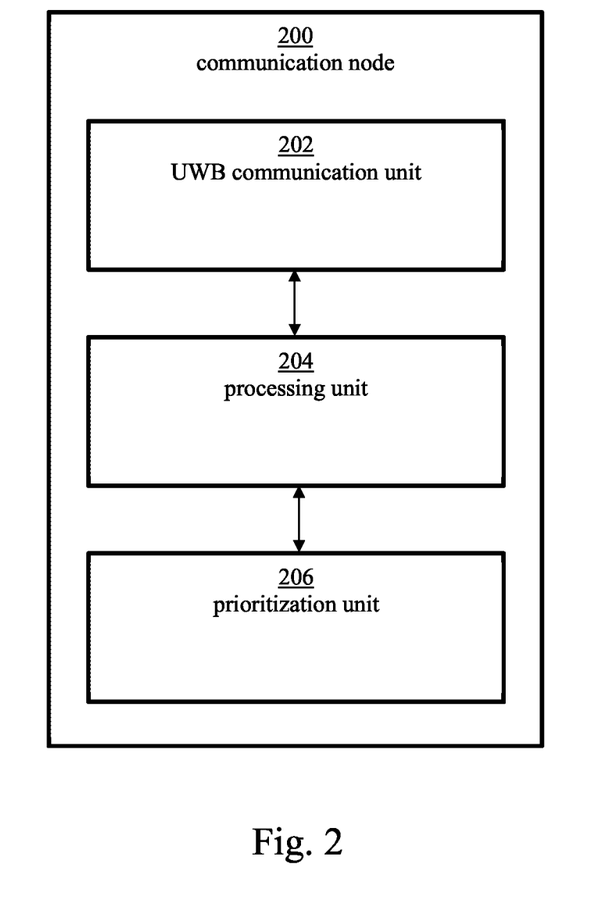
FIG. 2 shows an illustrative embodiment of a communication node.

FIG. 2 shows an illustrative embodiment of a communication node 200. The communication node 200 comprises a UWB communication unit 202, a processing unit 204 and a prioritization unit 206. The UWB communication unit 202 is configured to enable UWB communication with a plurality of external communication nodes (not shown). For instance, the UWB communication 202 may be configured to establish a UWB communication channel through which messages can be transmitted to and received from said external communication nodes. The processing unit 204 is configured to perform ranging sessions between the communication node and said external communication nodes, wherein said ranging sessions comprise one or more distance measurements based on messages exchanged between the communication node and said external communication nodes, wherein said messages are exchanged through the UWB communication unit. For example, these distance measurements may be based on the cumulative time of flight of messages transmitted by the communication node to the external communication nodes and responses transmitted by the external communication nodes to the communication node. Furthermore, the prioritization unit 206 is configured to prioritize said ranging sessions in dependence on at least one previously measured distance between the communication node and the respective external communication nodes. It is noted that, although the processing unit 204 and the prioritization unit 206 are shown as separate units, they may also be implemented as a single component or a single unit of the communication node. Thus, the system architecture may be implementation-dependent, and the functions of the processing unit 204 and prioritization unit 206 may for example be performed by a microcontroller, which acts as a host device for the UWB communication unit 202.

By prioritizing ranging sessions to be performed in dependence on a previously measured distance, the flexibility of the scheduling may be increased. For example, a higher priority may be given to ranging sessions with a particular external communication node if a previous distance measurement indicates that the communication node is approaching the external communication node. It is noted that the key 102 shown in FIG. 1 may be regarded as an example of a communication node, while the doors 104, 106 may be regarded as examples of external communication nodes. If the key 102 is equipped with a prioritization unit in accordance with the present disclosure, then the key 102 may increase the priority of ranging sessions with the second door 106 while the key 102 approaches said second door 106. Thus, the user will experience a smaller delay when attempting to open the second door 106. It is noted that the communication node may either act as an initiator or as a responder in the ranging sessions. In both cases, the ranging sessions can be prioritized by the prioritization unit of the communication node. Furthermore, a change in the priority of particular ranging sessions may in some use cases be communicated, by the communication node, to the external communication nodes with which said ranging sessions are performed, such that said external communication nodes can adapt their priority setting for the ranging sessions as well.

In one or more embodiments, the prioritization unit is configured to increase the priority of a specific one of said ranging sessions, to be performed with a specific external communication node, if one or more previously performed distance measurements with said specific external communication node indicate that the distance between the communication node and said specific external communication node has decreased. Thereby, the priority of ranging sessions with an external responder node that is being approached by a user carrying the communication node can easily be increased, which may in turn result in a better user experience. Furthermore, in one or more embodiments, the prioritization unit is configured to decrease the priority of said specific one of the ranging sessions if the previously performed distance measurements indicate that the distance between the communication node and the external communication node has increased. In this way, the priority of ranging sessions with an external responder node from which a user carrying the communication node is moving away can easily be decreased, thereby relinquishing UWB resources, which can subsequently be used for ranging sessions with other, more promising responder nodes (i.e., responder nodes which the user may be approaching).

In one or more embodiments, the prioritization unit is configured to compare the previously measured distance against at least one predefined range of distances, and to change the priority of the ranging sessions if the previously measured distance falls within said predefined range. For instance, in a practical implementation, the predefined range of distances corresponds to a geographical area or zone. In this way, a variety of use cases may be supported in an efficient manner.

In one or more embodiments, the prioritization unit is configured to prioritize a specific one of said ranging sessions by changing a value of a priority parameter used by a scheduler of the communication node. This results in a practical implementation of the prioritization of the ranging sessions. Furthermore, in one or more embodiments, when a specific ranging session associated with said priority parameter collides or overlaps with at least one other ranging session in a given time slot, the scheduler is configured to schedule said specific ranging session if the priority parameter has a higher value than a priority parameter associated with the other ranging session. Thereby, the implementation of the prioritization is further facilitated. In one or more embodiments, the prioritization unit is further configured to communicate a change of the value of the priority parameter to the external communication node with which the specific one of the ranging sessions is performed. Accordingly, the external communication node may also adjust the priority of the specific ranging session, such that the session priority is increased at both sides of the communication channel. Furthermore, in one or more embodiments, the prioritization unit is configured to communicate said change through the UWB communication unit. In this way, the priority change can easily be communicated to the communication counterpart.

In one or more embodiments, the prioritization unit is configured to prioritize said ranging sessions in dependence on data indicative of an application or a use of the communication node. In this way, the application or the use of the communication is taken into account. For instance, critical applications can be given a higher priority than non-critical applications. Furthermore, in one or more embodiments, the prioritization unit is configured to prioritize said ranging sessions in dependence on data derived from the previously measured distance and/or in dependence on data indicative of the previously measured distance. Thus, the prioritization does not need to be performed directly in dependence on the output of a previous distance measurement, but also in dependence on data derived therefrom and/or data indicative of said output. In one or more embodiments, the prioritization unit is further configured to prioritize said ranging sessions in dependence on at least one of the following parameters: the strength or quality of UWB communication channels established by the UWB communication unit, a detected movement of the communication node, and changes of characteristics of one or more additional communication channels. In this way, the user experience may be further improved. For instance, if the strength or quality of UWB communication channels through which the distance measurements are performed are relatively low, the priority of said ranging sessions may be increased, such that the likelihood that said ranging sessions are scheduled is increased. Furthermore, in a practical implementation, the communication node is a mobile device for accessing an external object, such as a vehicle, or a mobile device for opening an external object, such as a door.

Figure 3:
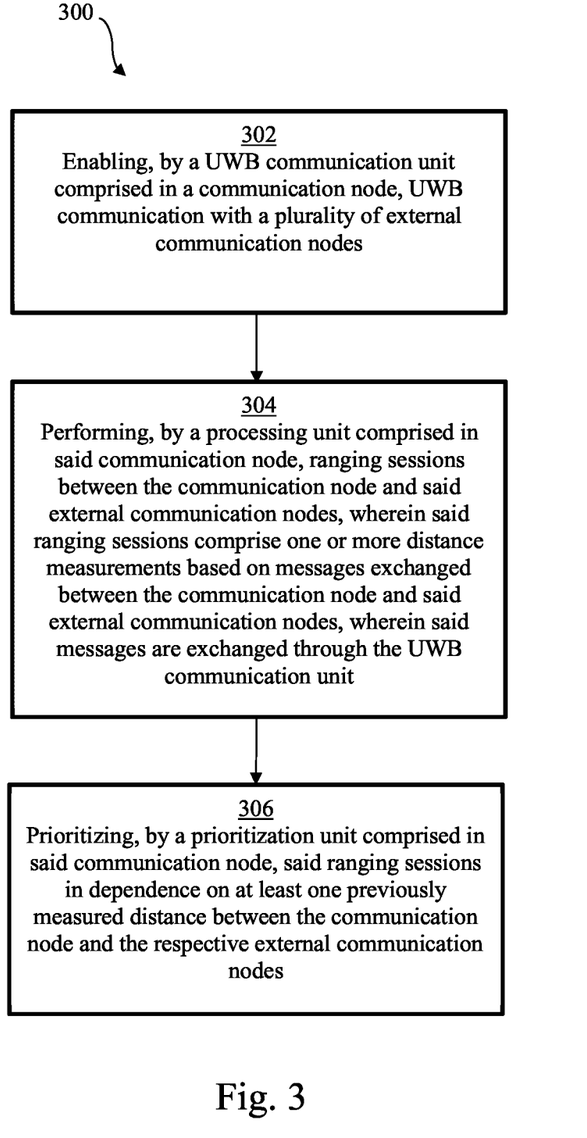
FIG. 3 shows an illustrative embodiment of a method of operating a communication node.

FIG. 3 shows an illustrative embodiment of a method 300 of operating a UWB communication node. The method 300 comprises the following steps. At 302, a UWB communication unit comprised in the communication node enables UWB communication with a plurality of external communication nodes. At 304, a processing unit comprised in the communication node performs ranging sessions between the communication node and said external communication nodes, wherein said ranging sessions comprise one or more distance measurements based on messages exchanged between the communication node and said external communication nodes, wherein said messages are exchanged through the UWB communication unit. Furthermore, at 306, a prioritization unit comprised in the communication node prioritizes said ranging sessions in dependence on at least one previously measured distance between the communication node and the respective external communication nodes. It is noted that distance measurements of the kind set forth are typically performed by comparing timestamps of messages which have been received by and transmitted by the respective communication nodes through a UWB communication channel. Accordingly, the ranging sessions may involve recording timestamps of the messages exchanged through the UWB communication unit; these timestamps may then be used to estimate the distance between the communication node and the external communication nodes.

Figure 4:
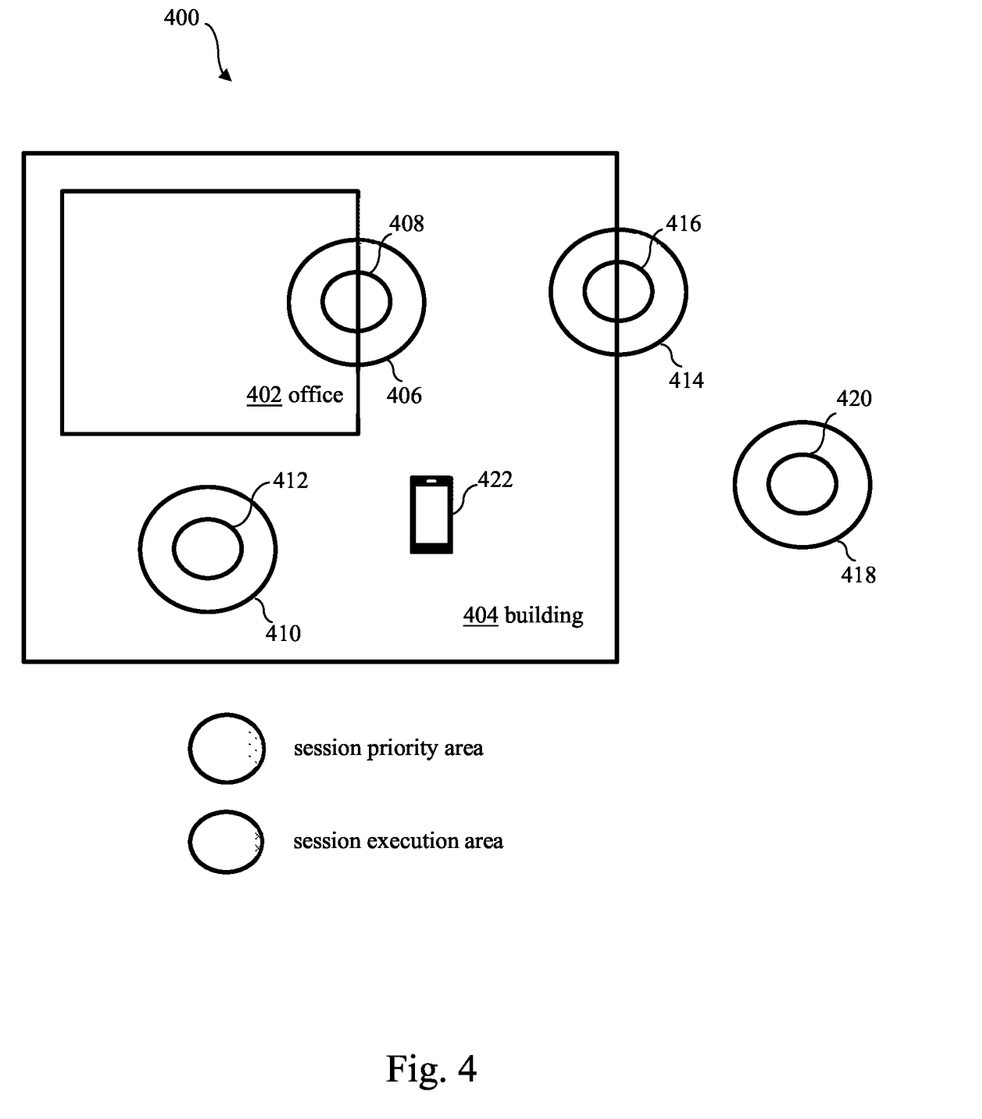
FIG. 4 shows an illustrative embodiment of a UWB-based access system.

FIG. 4 shows an illustrative embodiment of a UWB-based access system 400. The system 400 comprises an office 402, a building 404, a vehicle (not shown) and an electronic device (not shown) that may be accessed by means of a UWB-enabled mobile device 422, for example a mobile phone. More specifically, the objects that may be accessed or opened in the system 400 are a door of the office 402, a door of the building 404, the vehicle and the electronic device. The electronic device may for example be a personal computer configured to execute a particular user application. Around each object that may be accessed or opened, a session execution area is defined, as well as a session priority area. For example, areas 406 and 408 are defined around the office door, areas 410 and 412 are defined around the electronic device, areas 414 and 416 are defined around the building door, and areas 416 and 418 are defined around the vehicle. In operation, when the mobile device 422, which acts as a key, enters a given session priority area, the prioritization unit of the mobile device 422 will assign a higher priority to the ranging sessions performed with the object corresponding to the given session priority area, at the expense of ranging sessions performed with other objects of the system 400. In this way, the ranging operations with the object in question can be performed more quickly, resulting in a smaller delay in accessing or opening said object. Consequently, the user experience may be improved.

More specifically, a distance-based session priority function may use the distance that has been measured in a previous session for adapting the priority of the current session. The mobile device 422 executes an application for ranging with every object in the system 400. Every application has a session priority area and a session execution area. In the session execution area, the application corresponding to the session in question is effectively executed. For example, if the mobile phone 422 enters the session execution area 420 of the vehicle, the application corresponding to the ranging session with the vehicle is executed and, provided that the mobile device 422 transmits a valid user credential to the vehicle, the vehicle is opened and allowed to be started. In general, if the mobile phone 422 accesses a session priority area, the priority of the corresponding session is increased. In the given example, if the mobile device 422 enters the session priority area 418 around the vehicle, the ranging session between the mobile phone 422 and the vehicle is given a higher priority. Conversely, if the mobile phone 422 leaves the session priority area 418 around the vehicle, the ranging session between the mobile phone 422 and the vehicle may be given a lower priority.

Similarly, by entering the session priority area 414 of the building door, the priority of the session between the mobile device 422 and the building door may be increased. Consequently, the delay between the entering of the session execution area 416 of the building door and the actual session execution may be decreased significantly, as a result of which the door may open faster. Furthermore, when the user carrying the mobile device 422 leaves the building door area and walks to the office 402, the priority of the building door session may be decreased, and the priority of the office door session may be increased as soon as the session priority area 406 of the office door is entered. In general, by setting for example an appropriate priority increase value, an appropriate session priority area radius and an appropriate session execution area radius, an application programmer can have a significant impact on the user experience of a particular use case. For example, a car access application may be given a higher priority increase value and larger application area radius than a building door lock.

Figure 5:
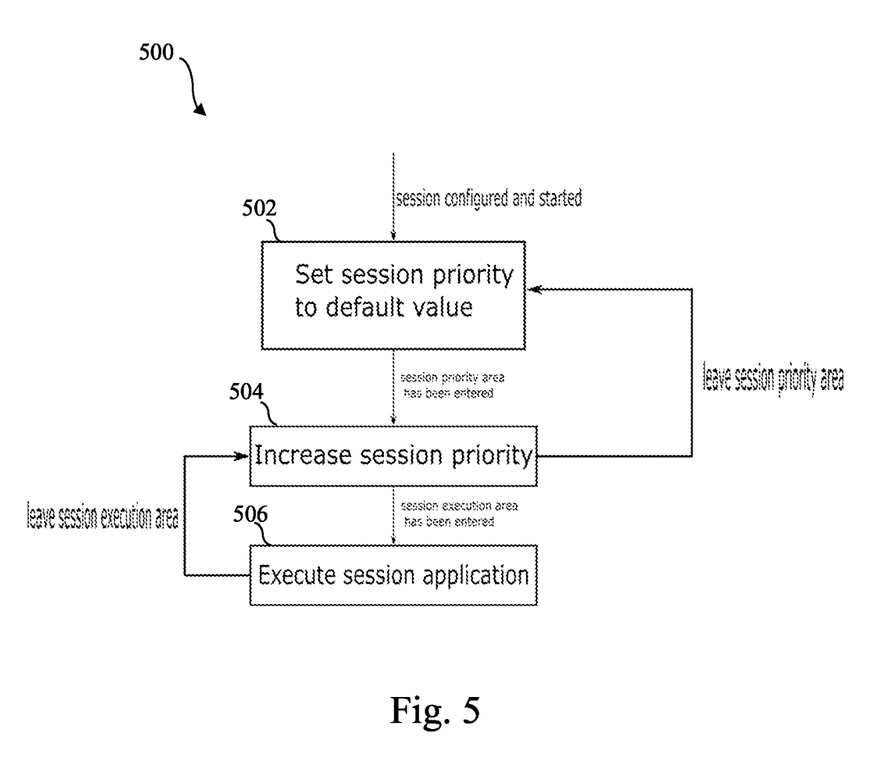
FIG. 5 shows an illustrative embodiment of a method of managing a session execution.

FIG. 5 shows an illustrative embodiment of a method 500 of managing a session execution. The method 500 comprises, at 502, setting a session priority to a default value (e.g., a preconfigured value), at 504, increasing a session priority, and at 506, executing a corresponding session application. In particular, FIG. 5 shows how a session priority increase can be implemented in a UWB controller of a communication node of the kind set forth. After a session is configured and started, the UWB session priority is set to its default value. The default value is either an IC-internal setting or it may be configured as a session parameter. Additionally, a radius for the priority increase and the application execution radius may be set in the configuration. When the measured distance values are smaller than the radius set for the priority increase, the session priority is increased. When the measured distance meets the conditions that have been set for the application execution, the application is executed, e.g. the door opens or a command for opening the door is sent. If the distance increases again and meets a previously defined execution border, the application execution stops (e.g., the door closes). When the measured distance also exceeds the limits of the priority zone, the session priority decreases again to the default value.

For more complex use cases, a more advanced dynamic priority setting may be applied. Equation 1 shows an example of how the priority can be set within the scheduler. In this example, the priority includes two parts, i.e. a distance or location-dependent part f (d1, d2, d3, . . . dN), where d1 to dN are the measured device distances and a non-distance dependent part p(t). It is noted that p(t) can for example be a priority value that changes over time or any other priority function that changes depending on its input parameter. Equation 2 shows an example of a distance-based priority change function. The factors k1 to k3 are scaling factors for weighting the different distance changes. The variables o1 and o2 are distance offsets that are needed to avoid that the priority reaches an infinite value. Assuming positive scaling factors in the example shown in Equation 2, the session priority P will increase the larger the distance d3 becomes and the smaller the distances d1 and d2 become. Referring to the example shown in FIG. 4, the distances d1 and d2 may be the distances to the office door and the distance to the building door, while the distance d3 may be the distance to the vehicle. Accordingly, when the distance to the vehicle increases, the priority of the door lock application increases. Independent from the distance to the vehicle, also the office door priority increases if the distance to the building door or office door decreases.

$$P = f(d1, d2, d3, \ldots dN, p(t)) + p(t) \qquad \text{(Equation 1)}$$

$$f(d1, d2, d3) = \frac{k1}{d1+o1} + \frac{k2}{d2+o2} + d3*k3 \quad \text{(Equation 2)}$$

It is noted that equations 1 and 2 are merely illustrative examples of how a dynamic priority setting can be implemented. In order to further improve the user experience, also derivations of the distance may be used for making a prioritization change of a session. Furthermore, the prioritization may be performed in dependence on, for example, parameters indicative of the strength or quality of the UWB communication channels, of a device movement as detected by an inertial measurement unit, and of out-of-band communication channel characteristics. The parameters indicative of the strength or quality of the UWB communication channels may provide a good indication of the measurement quality. Depending on these parameters, the priority of a session may be increased or decreased. For example, if the channel quality of a session is very bad, this will most likely lead to a decreased measurement accuracy. Accordingly, the priority of sessions with the same external responder node may be increased, in order to increase the likelihood that those sessions are scheduled. Whether and how said parameters are used for prioritizing or deprioritizing a task may be application-dependent.

As mentioned above, a device movement may also be detected by an inertial measurement unit (IMU) within a communication node of the kind set forth. An IMU may measure device orientation changes as well as translational accelerations. Based on this acceleration, a priority increase may be triggered. For example, if a device recognizes that it is moved, it may send an out-of-band or in-band priority increase request, in order to be tracked more frequently. An out-of-band channel parameter may give a first estimation of a distance change or a UWB communication channel change, which may be also used for setting the priority. Examples of out-of-band communication channels are Bluetooth low energy (BLE), Wi-Fi and ZigBee. For example, if a BLE interface detects a received signal strength indicator (RSSI) value increase between a door and a key, then it is likely that the lock-to-key distance has decreased, which means that a ranging session priority of a corresponding UWB session for localizing the key may be increased. Again, whether and how such criteria are used for prioritizing or deprioritizing a task may be application-dependent.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

- 100 UWB-based access system
- 102 UWB key
- 104 UWB door
- 106 UWB door
- 200 communication node
- 202 UWB communication unit
- 204 processing unit
- 206 prioritization unit
- 300 method of operating a communication node
- 302 enabling, by a UWB communication unit comprised in a communication node, UWB communication with a plurality of external communication nodes
- 304 performing, by a processing unit comprised in said communication node, ranging sessions between the communication node and said external communication nodes, wherein said ranging sessions comprise one or more distance measurements based on messages exchanged between the communication node and said external communication nodes, wherein said messages are exchanged through the UWB communication unit
- 306 prioritizing, by a prioritization unit comprised in said communication node, said ranging sessions in dependence on at least one previously measured distance between the communication node and the respective external communication nodes
- 400 UWB-based access system
- 402 office
- 404 building
- 406 session priority area for office door
- 408 session execution area for office door
- 410 session priority area for electronic device
- 412 session execution area for electronic device
- 414 session priority area for building door
- 416 session execution area for building door
- 418 session priority area for vehicle
- 420 session execution area for vehicle
- 500 method of managing a session execution
- 502 set session priority to default value
- 504 increase session priority
- 506 execute session application

The invention claimed is:

1. A communication node, comprising:
   an ultra-wideband, UWB, communication unit configured to enable UWB communication with a plurality of external communication nodes;
   a processing unit configured to perform ranging sessions between the communication node and said external communication nodes, wherein said ranging sessions comprise one or more distance measurements based on messages exchanged between the communication node and said external communication nodes, wherein said messages are exchanged through the UWB communication unit; and
   a prioritization unit configured to prioritize said ranging sessions in dependence on at least one previously measured distance between the communication node and the respective external communication nodes, wherein the prioritization unit is configured to increase the priority of a specific one of the ranging sessions, to be performed with a specific external communication node, when one or more previously performed distance measurements with the specific external communication node indicate that the distance between the communication node and the specific external communication node has decreased.

2. The communication node of claim 1, wherein the prioritization unit is configured to decrease the priority of said specific one of the ranging sessions if the previously performed distance measurements indicate that the distance between the communication node and the external communication node has increased.

3. A communication node, comprising:
   an ultra-wideband, UWB, communication unit configured to enable UWB communication with a plurality of external communication nodes;
   a processing unit configured to perform ranging sessions between the communication node and the external communication nodes, wherein the ranging sessions comprise one or more distance measurements based on messages exchanged between the communication node and the external communication nodes, wherein the messages are exchanged through the UWB communication unit; and
   a prioritization unit configured to prioritize the ranging sessions in dependence on at least one previously measured distance between the communication node and the respective external communication nodes, wherein the prioritization unit is configured to compare the previously measured distance against at least one predefined range of distances, and to change the priority of the ranging sessions if the previously measured distance falls within said predefined range.

4. The communication node of claim 3, wherein the predefined range of distances corresponds to a geographical area or zone.

5. The communication node of claim 1, wherein the prioritization unit is configured to prioritize a specific one of said ranging sessions by changing a value of a priority parameter used by a scheduler of the communication node.

6. A communication node, comprising:
   an ultra-wideband, UWB, communication unit configured to enable UWB communication with a plurality of external communication nodes;
   a processing unit configured to perform ranging sessions between the communication node and the external communication nodes, wherein the ranging sessions comprise one or more distance measurements based on messages exchanged between the communication node and the external communication nodes, wherein the messages are exchanged through the UWB communication unit; and
   a prioritization unit configured to prioritize the ranging sessions in dependence on at least one previously measured distance between the communication node and the respective external communication nodes, wherein the prioritization unit is configured to prioritize a specific one of the ranging sessions by changing a value of a priority parameter used by a scheduler of the communication node, and wherein, when a specific ranging session associated with said priority parameter collides or overlaps with at least one other ranging session in a given time slot, the scheduler is configured to schedule said specific ranging session if the priority parameter has a higher value than a priority parameter associated with the other ranging session.

7. The communication node of claim 5, wherein the prioritization unit is further configured to communicate a change of the value of the priority parameter to the external communication node with which the specific one of the ranging sessions is performed.

8. The communication node of claim 7, wherein the prioritization unit is configured to communicate said change through the UWB communication unit.

9. The communication node of claim 1, wherein the prioritization unit is further configured to prioritize said ranging sessions in dependence on data indicative of an application or a use of the communication node.

10. The communication node of claim 1, wherein the prioritization unit is configured to prioritize said ranging sessions in dependence on data derived from the previously measured distance and/or in dependence on data indicative of the previously measured distance.

11. The communication node of claim 1, wherein the prioritization unit is further configured to prioritize said ranging sessions in dependence on at least one of the following parameters: the strength or quality of UWB communication channels established by the UWB communication unit, a detected movement of the communication node, and changes of characteristics of one or more additional communication channels.

12. The communication node of claim 1, being a mobile device for accessing an external object, such as a vehicle, or a mobile device for opening an external object, such as a door.

13. A method of operating a communication node, comprising:
enabling, by an ultra-wideband, UWB, communication unit comprised in said communication node, UWB communication with a plurality of external communication nodes;
performing, by a processing unit comprised in said communication node, ranging sessions between the communication node and said external communication nodes, wherein said ranging sessions comprise one or more distance measurements based on messages exchanged between the communication node and said external communication nodes, wherein said messages are exchanged through the UWB communication unit; and
prioritizing, by a prioritization unit comprised in said communication node, said ranging sessions in dependence on at least one previously measured distance between the communication node and the respective external communication nodes, wherein prioritizing includes increasing the priority of a specific one of the ranging sessions, to be performed with a specific external communication node, when one or more previously performed distance measurements with the specific external communication node indicate that the distance between the communication node and the specific external communication node has decreased.

14. The method of claim 13, wherein the prioritization unit decreases the priority of said specific one of the ranging sessions if the previously performed distance measurements indicate that the distance between the communication node and the external communication node has increased.

15. A method of operating a communication node, comprising:
enabling, by an ultra-wideband, UWB, communication unit comprised in the communication node, UWB communication with a plurality of external communication nodes;
performing, by a processing unit comprised in the communication node, ranging sessions between the communication node and the external communication nodes, wherein the ranging sessions comprise one or more distance measurements based on messages exchanged between the communication node and the external communication nodes, wherein the messages are exchanged through the UWB communication unit; and
prioritizing, by a prioritization unit comprised in the communication node, the ranging sessions in dependence on at least one previously measured distance between the communication node and the respective external communication nodes, wherein the prioritization unit compares the previously measured distance against at least one predefined range of distances, and changes the priority of the ranging sessions if the previously measured distance falls within said predefined range.

16. The method of claim 15, wherein the predefined range of distances corresponds to a geographical area or zone.

* * * * *